Oct. 21, 1958 W. E. MEAGHER 2,857,504
KNURLING AND TRIMMING ROLLER FOR SEAM WELDERS
Filed March 7, 1956 2 Sheets-Sheet 1

INVENTOR.
William E. Meagher
BY
Merchant & Merchant
ATTORNEYS

Oct. 21, 1958     W. E. MEAGHER     2,857,504
KNURLING AND TRIMMING ROLLER FOR SEAM WELDERS
Filed March 7, 1956     2 Sheets-Sheet 2

INVENTOR.
William E. Meagher
BY
Merchant & Merchant
ATTORNEYS

United States Patent Office 2,857,504
Patented Oct. 21, 1958

2,857,504
KNURLING AND TRIMMING ROLLER FOR SEAM WELDERS

William E. Meagher, Minneapolis, Minn.

Application March 7, 1956, Serial No. 570,112

7 Claims. (Cl. 219—81)

My invention relates generally to electrical resistance seam welding apparatus of the type utilizing cooperating disc-like rotary welding electrodes, and more particularly to improvements in driving and trimming rollers for such electrodes.

It is well-known among those skilled in the art that rotary electrodes, being made from relatively soft copper or alloys thereof, and being applied under pressure to opposite sides of the work to feed and weld the same, are softened further at their peripheral edges under the heat of welding of the work. This heat and pressure tends to flatten the knurling of the peripheral faces of the electrodes, and causes the peripheral portions thereof to expand axially or "mushroom." When this occurs, the machine must be regulated to adjust the welding voltage due to the increased surface contact of the electrodes, to maintain uniformity of the weld and, unless the operator is extremely skillful and alert, a poor weld results. Heretofore, when an electrode has mushroomed to a given width, it has been necessary to remove the same to a lathe or the like, trim off the excess material from the opposite sides to true up the same, and reknurl the peripheral surface thereof. This operation reduces the effective life of the electrodes to a considerable extent and causes a substantial amount of work time to be lost during the machining operation.

An important object of my invention is the provision of a trimming and driving roller for a rotary seam welding electrode which will effectively trim the side walls of the electrode adjacent its periphery, and which will knurl the peripheral work-engaging surface thereof continuously during operation of the welding machine.

Another important object of my invention is the provision of a driving and trimming roller as set forth having cutting teeth for trimming the opposite sides of the electrode and constructed and arranged so that the cutting teeth are prevented from trimming more than the desired amount of material from the electrode.

Another object of my invention is the provision of a driving and trimming roller which will automatically prevent warping of the electrode at the peripheral portion thereof and maintain the same true during its operation.

A still further object of my invention is the provision of a driving and trimming roller as set forth which will form a knurled relatively shallow crown on the peripheral surface of the electrode, whereby extreme welding pressure is removed from the opposite marginal edges of the electrode.

Still another object of my invention is the provision of a driving and trimming roller of the above type comprising cooperating sections each of which may be removed and replaced when worn to a greater extent than the others of said sections.

Another object of my invention is the provision of a driving and trimming roller which is relatively inexpensive to produce, which is highly efficient in operation, and which is rugged in construction and durable in use.

The above, and still further, highly important objects and advantages of my invention will become apparent from the following detailed specification, appended claims, and attached drawings.

Referring to the drawings, which illustrate the invention, and in which like reference characters indicate like parts throughout the several views.

Figure 1:
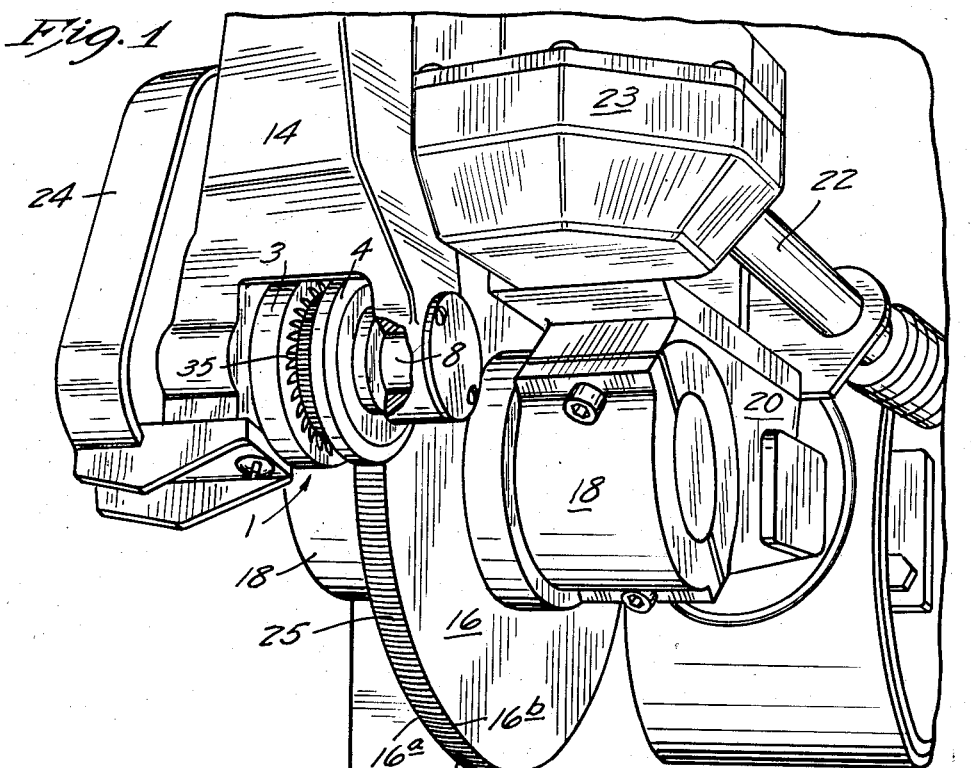
Fig. 1 is a fragmentary view in perspective of a seam welder incorporating a preferred embodiment of my novel driving and trimming roller, some parts being broken away and some parts shown in section.
Figure 2:
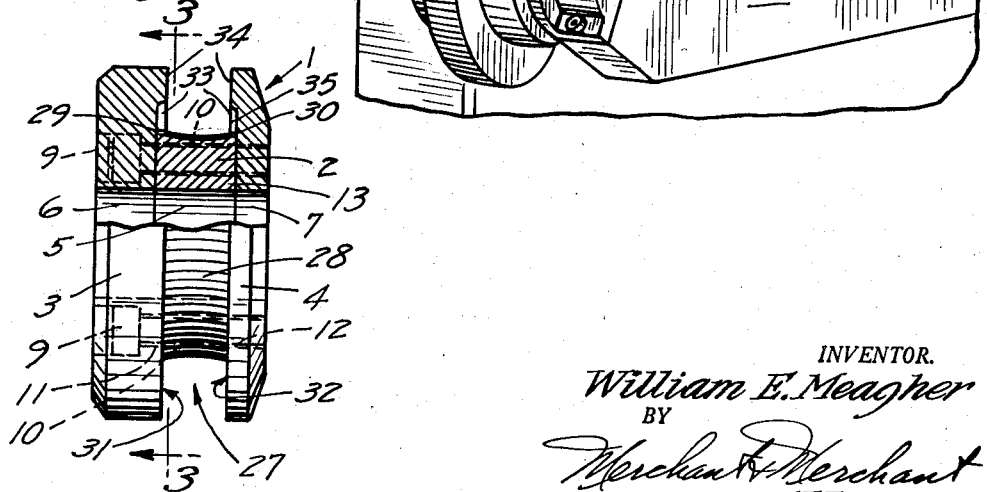
Fig. 2 is a view in side elevation of the driving and trimming roller of Fig. 1, some parts being broken away and some parts being shown in section.
Figure 3:
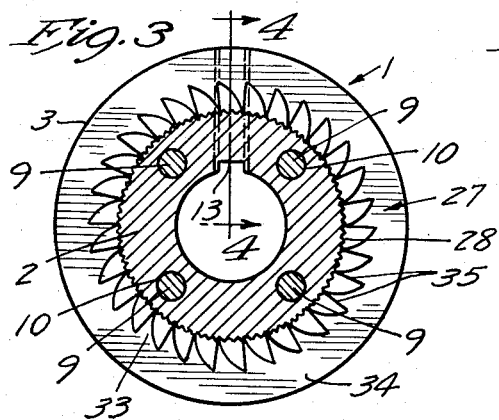
Fig. 3 is a transverse section taken substantially on the line 3—3 of Fig. 2.
Figure 4:
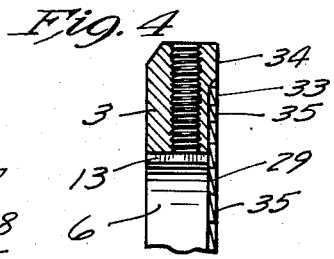
Fig. 4 is a fragmentary section taken substantially on the line 4—4 of Fig. 3.

In the preferred embodiment of the invention illustrated in Figs. 1–4, a driving and trimming roller is indicated generally by the numeral 1, and is shown as comprising an intermediate roller section 2 and opposed end sections 3 and 4. The intermediate and end sections 2, 3 and 4 are provided with aligned axial openings 5, 6 and 7 respectively for reception of a drive shaft 8. The several roller sections are held together by a plurality of anchoring screws or the like 9 which extend through aligned openings 10 and 11 in the intermediate section 2 and end section 3 respectively, and are screw threaded in threaded openings 12 in the end section 4. The roller sections are provided with aligned keyways 13 for reception of a key or keys not shown by means of which the roller 1 is locked to the drive shaft 8 for common rotation therewith.

The drive shaft 8 is journaled in suitable bearings in a mounting head 14 of a conventional seam welder indicated generally at 15. The welder 15 is of a type generally used to seam-weld sheet metal parts together by electrical resistance, and employs cooperating disc-like rotary electrodes 16 and 17 that are journaled in bearings 18 and 19 respectively. The bearings 18 form part of an upper structure 20, and the bearings 19 are secured to a lower structure 21, said structures forming extensions of the secondary winding of a welding transformer, not shown. The welding transformer, together with other parts of the machine not shown, are well-known in the art and, not in themselves comprising the instant invention, detailed showing and description thereof is deemed unnecessary. Hence, for the sake of brevity such detailed showing and description is omitted. However, it may be assumed that the lower welding electrode 17 is an idler roller, the upper electrode 16 being driven by the driving and trimming roller 1 from a suitable motor, not shown, through connections including a shaft and transmission mechanism not shown but contained within housings 23 and 24.

With reference to Fig. 1, it will be seen that both the relatively large diameter electrode 16 and small diameter electrode 17 have knurled peripheral faces 25 and 26 respectively. The knurling on the face 25 of the upper electrode 16 is important to the efficient welding operation in that the upper roller 16 imparts feeding movement to the work as it passes between the rotary electrodes 16 and 17. The knurling provides for a plurality of electrical impulses passing through the work between the electrodes 16 and 17, the teeth comprising the knurled surface 25 being sufficiently close together so that the welds caused thereby overlap to form a continuous welded seam.

As above indicated, the welding electrodes 16 and 17 are usually made from relatively soft copper alloys or the like, and the heat generated in the welding operation tends to further soften the peripheral portions of the electrodes 16 and 17. Inasmuch as the electrodes 16 and 17 are held against opposite sides of the work with a substantial amount of pressure, the knurling on the peripheral faces 25 and 26 tends to become flattened. Furthermore, the peripheral portions of the electrodes 16 and 17 tend to expand axially of the electrodes or mushroom, thus causing a wider area of contact between the electrodes and the work than is desirable. When this occurs, the voltage of the welder must be regulated to compensate for the increased contact area between the electrodes and the work and, unless the operator is alert, a poor weld results. In some instances, when one or the other of the electrodes 16 or 17 is of a relatively large diameter, such as the electrode 16, continued use results in warping of the electrode 16 so that the welded seam becomes crooked and a defective weld often results.

The intermediate section 2 and the end section 3 and 4 of the roller 1 cooperate to define a radially outwardly opening endless circumferential channel 27, the outer peripheral surface of the intermediate section 2 being knurled as indicated at 28. The knurled surface 28 is of greater diameter at its opposite ends than at its axially central portion, whereby to provide a relatively shallow concave outline, see Fig. 2. It will further be noted with reference to Fig. 2 that the opposite end roller sections 3 and 4 are counter bored as indicated at 29 and 30 respectively to receive the opposite ends of the intermediate section 2, and that the knurling 28 extends within the counter-bores 29 and 30. The end sections 3 and 4 have opposed radial walls 31 and 32 respectively, which radial walls form the opposite sides of the channel 27. The wall surfaces 31 and 32 are spaced apart a distance only sufficiently greater than the normal width of the electrode 16 to permit running clearance between the radial wall surfaces 31 and 32 and the adjacent side surfaces of the electrode 16 adjacent the periphery thereof when the outer surface 25 of the rotary electrode 16 is in operative driving engagement with the knurled surface 28 of the roller 1. The radial wall surfaces 31 and 32 each define radially inner and outer annular wall surface portions 33 and 34 respectively. The outer annular wall surface portions 34 are smooth whereas the inner wall surface portions each define a plurality of circumferentially spaced cutting teeth 35, the cutting edges of which are coplanar with their respective smooth annular wall surface portions 34. Preferably, the counter-bores 29 and 30 in their respective end sections 3 and 4 are of a depth substantially equal to the depth of the teeth 35, so that the knurling 28 on the intermediate roller section 2 extends axially to the bottom of the teeth 35.

In operation, it may be assumed that the roller 1 carried by the bearing bracket 14 exerts sufficient pressure against the periphery of the rotary electrode 16 to drive the same and feed the work to be welded between the electrodes 16 and 17. The knurling teeth 28 on the intermediate section 2 knurl the peripheral surface 25 of the electrode 16 and form the peripheral surface into a relatively shallow crown, so that the axially central portion thereof engages the work to be welded with greater pressure than do the opposite marginal edges 16a and 16b thereof. As above indicated, the heat of welding causes the outer peripheral portion of the electrode 16 to become softer than the radially inner portions thereof, and the pressure applied by the electrodes 16 and 17 to the work causes the outer peripheral portion of the electrode 16 to expand in a direction axially thereof, or to mushroom. As soon as this condition occurs, the cutting teeth 35 immediately trim off the excess width, and the smooth annular wall surface portions 34 prevent the teeth 35 from cutting into the adjacent sides of the electrode 16 beyond the planes of the opposite side surfaces thereof. Moreover, the annular surface portions 34 operate to straighten out any warp which may occur in the outer peripheral portion of the electrode 16. Thus, a relatively straight seam weld of uniform width is achieved throughout the length of the seam. Although I have shown my improved driving and trimming roller 1 as being applied only to the electrode 16, it may be assumed that a similar driving and trimming roller may also be applied to the cooperating rotary electrode 17, although this is not absolutely essential. However, in machines where the electrode 17 is of a relatively large diameter similar to the electrode 16, and wherein both electrodes are driven, it is advisable that a second driving and trimming roller 1 is applied also to the electrode 17.

From the above it should be obvious that, inasmuch as the roller 1 is in continuous operation, a minimum of material is trimmed from the sides of the electrode 16, and the effective life thereof is increased to a marked degree. Furthermore, with my novel roller 1, it is not necessary for the operator to adjust the heat settings on the machine at any time except where changes in the nature of the work demand such heat adjustment, such as occurs when the total thickness of the work being welded is changed.

In the event that any one of the roller sections 2, 3 or 4 become unduly worn, it is a relatively simple matter to replace such a worn section. It is only necessary to remove the roller 1 from the drive shaft 8 and disassemble the same by removing the anchoring screws 9, after which a new section may be substituted for the worn section, the anchoring screws 9 being replaced and the roller again mounted on the drive shaft 8. The several sections are preferably made from hardened steel, so that the effective life thereof is relatively long and replacement of a worn section is a relatively rare occurrence.

Figure 5:
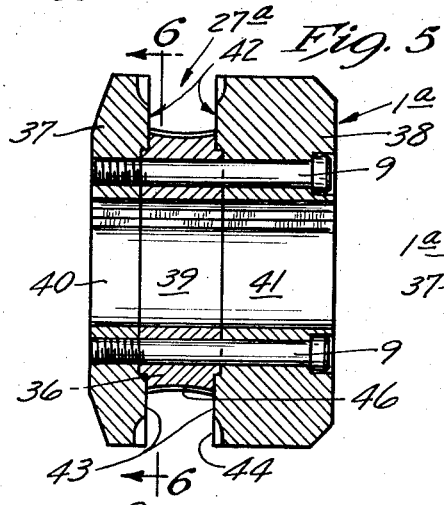
Fig. 5 is a view in axial section of a modified form of the driving and trimming roller of Figs. 1–4.
Figure 6:
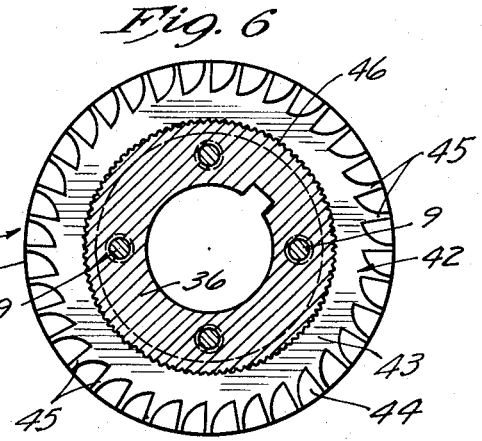
Fig. 6 is a transverse section taken substantially on the line 6—6 of Fig. 5.

In the modified form of the invention illustrated in Figs. 5 and 6, a cutting roller 1a is shown as comprising a central section 36 and end sections 37 and 38, each of said sections having aligned central shaft receiving apertures 39, 40 and 41. The several sections are held together by anchoring screws 9 in the same manner as those of the structure of Figs. 1–4 inclusive. The roller 1a differs from the roller 1 in that the endless circumferential channel 27a of the roller 1a is defined by radial walls 42 having inner annular wall surface portions 43 that are smooth, and radially outer annular wall surface portions 44 defined by a plurality of circumferentially spaced cutting teeth 45. It will be noted also that the intermediate section 36 is provided with circumferentially spaced knurling teeth 46 substantially identical to the knurling teeth 28 of the roller 1, and which are shaped from end to end to define a shallow concave outline. The cutting edges of the teeth 45, like those of the teeth 35 of the roller 1, are coplanar with their respective smooth annular wall surface portions 42. Thus the roller 1a operates in a manner identical to that of the roller 1, the smooth annular wall surface portions 42 serving to guide the rotary electrode, and the teeth 45 trimming off portions of the rotary electrode which mushroom axially outwardly from the planes of the adjacent side surfaces of the electrode.

Figure 7:
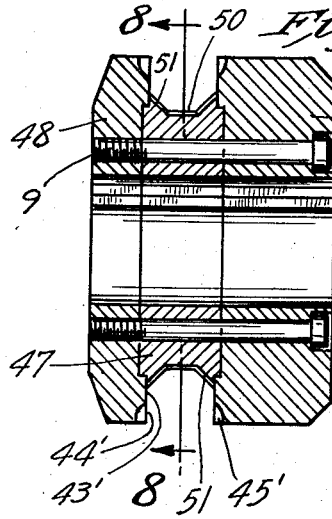
Fig. 7 is a view corresponding to Fig. 5 showing a still further modified form of the invention.
Figure 8:
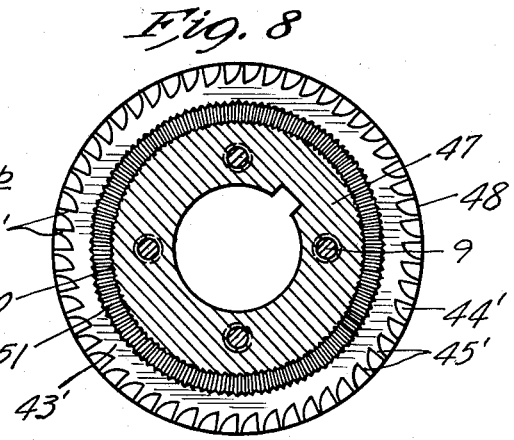
Fig 8 is a transverse section taken substantially on the line 8—8 of Fig. 7.

In the modified arrangement shown in Figs. 7 and 8, a driving and trimming roller 1b is shown as comprising a central section 47 and end sections 48 and 49, the end sections differing from the sections 37 and 38 respectively only as to dimension but not as to arrangement. In other words, the radially inner smooth annular wall surface portion 43' is of less radial width than that of the corresponding surface 43 of the roller 1a. In like manner, the teeth 45' of the roller 1b are of less radial length than the teeth 45 of the roller 1a. The central section 47 differs from the central sections 2 and 36 of the rollers 1 and 1a respectively in that the roller 1b is adapted for use with a chamfered electrode not shown. For this reason, intermediate section 47 is provided with knurling teeth 50 which, at their axially central portions are parallel to the axis of the roller 1b and which, at their end portions, extend outwardly toward the adjacent radial walls 43' at an oblique angle with respect thereto as indicated at 51. Inasmuch as a chamfered electrode is, like the electrode 16, subject to axial expansion or mushrooming under welding heat and pressure, the annular wall portions 43' and 44' are necessary to hold the electrode against warping and to continuously trim off axially expanded portions of the electrode immediately upon formation of such expanded portions.

While I have shown a preferred embodiment of my invention and two modifications thereof, it will be understood that the same is capable of further modification without departure from the spirit and scope of the invention as defined in the claims.

What I claim is:

1. A knurling and trimming roller for seam welders having cooperating disc-like rotary electrodes, said roller being adapted to be mounted on a shaft for rotary engagement with one of said rotary electrodes, said roller defining an endless radially outwardly opening circumferential channel for reception of the peripheral portion of said engaged rotary electrode, said channel having a knurled bottom wall adapted for tangential driving engagement with the peripheral surface of said electrode and opposed radial walls at opposite axial end portions of said bottom wall, said radial walls each defining radially inner and outer annular wall surface portions, one of said annular wall surface portions being smooth, the other thereof providing cutting teeth for trimming off peripheral portions of the electrode which become axially expanded beyond the normal thickness of the electrode, the cutting edges of said teeth being coplanar with said smooth annular wall surface portion.

2. The structure defined in claim 1 in which said roller comprises, an intermediate section defining the bottom wall of said channel, opposite end sections defining the opposed radial walls of said channel, and means for releasably locking said sections together.

3. The structure defined in claim 2 in which said end sections are counter-bored to receive the adjacent ends of said intermediate section, whereby the knurled surface of said intermediate section extends axially beyond the planes of said radial wall surfaces.

4. The structure defined in claim 1 in which the knurled bottom wall of said channel is of greater diameter adjacent said radial walls than at its axial center to provide a concave outline, whereby said roller will form a relatively shallow knurled crown on the periphery of said electrode when in driving engagement therewith.

5. A knurling and trimming roller for seam welders having cooperating disc-like rotary electrodes, said roller being adapted to be mounted on a drive shaft for driving engagement with one of said rotary electrodes, said roller defining an endless radially outwardly opening circumferential channel for reception of the peripheral portion of said engaged rotary electrode, said channel having a knurled bottom wall adapted for tangential driving engagement with the peripheral surface of said electrode and opposed radial walls at opposite axial end portions of said bottom wall, said radial walls each defining radially inner and outer annular wall surface portions, said outer annular wall surface portion being smooth, said inner annular wall surface portion defining cutting teeth for triming off peripheral portions of the electrode which become axially expanded beyond the normal thickness of the electrode, the cutting edges of said teeth being coplanar with said smooth annular wall surface portion.

6. A knurling and trimming roller for seam welders having cooperating disc-like rotary electrodes, said roller being adapted to be mounted on a drive shaft for driving engagement with one of said rotary electrodes, said roller defining an endless radialy outwardly opening circumferential channel for reception of the peripheral portion of the engaged rotary electrode, said channel having a knurled bottom wall adapted for tangential driving engagement with the peripheral surface of said electrode and opposed radial walls at opposite axial end portions of said bottom wall, said radial walls each defining radially inner and outer annular wall surface portions, said inner annular wall surface portion being smooth, said outer annular wall surface portion providing cutting teeth for trimming off peripheral portions of the electrode which become axially expanded beyond the normal thickness of the electrode, the cutting edges of said teeth being coplanar with said smooth annular wall surface portion.

7. A knurling and trimming roller for seam welders having cooperating disc-like rotary electrodes, said roller being adapted to be mounted on a drive shaft for driving engagement with one of said rotary electrodes, said roller defining an endless radially outwardly opening circumferential channel for reception of the peripheral portion of said engaged rotary electrode, said channel having a knurled bottom wall adapted for tangential driving engagement with the peripheral surface of said electrode and opposed radial walls at opposite axial end portions of said bottom wall, said knurled bottom wall having an axially extended central portion and opposite end portions extending outwardly toward the adjacent radial walls at oblique angles with respect thereto, said radial walls each defining radially inner and outer annular wall surface portions, one of said annular surface portions being smooth, the other thereof providing cutting teeth for trimming off peripheral portions of the electrode which become axially expanded beyond the normal thickness of the electrode, the cutting edges of said teeth being coplanar with said smooth annular wall surface portion.

References Cited in the file of this patent

UNITED STATES PATENTS

| | | |
|---|---|---|
| 1,822,371 | Pioch et al. | Sept. 8, 1931 |
| 1,862,108 | Brueckner | June 7, 1932 |
| 2,323,903 | Fentress | July 13, 1943 |
| 2,467,091 | O'Neill | Apr. 12, 1949 |